Figure 1:
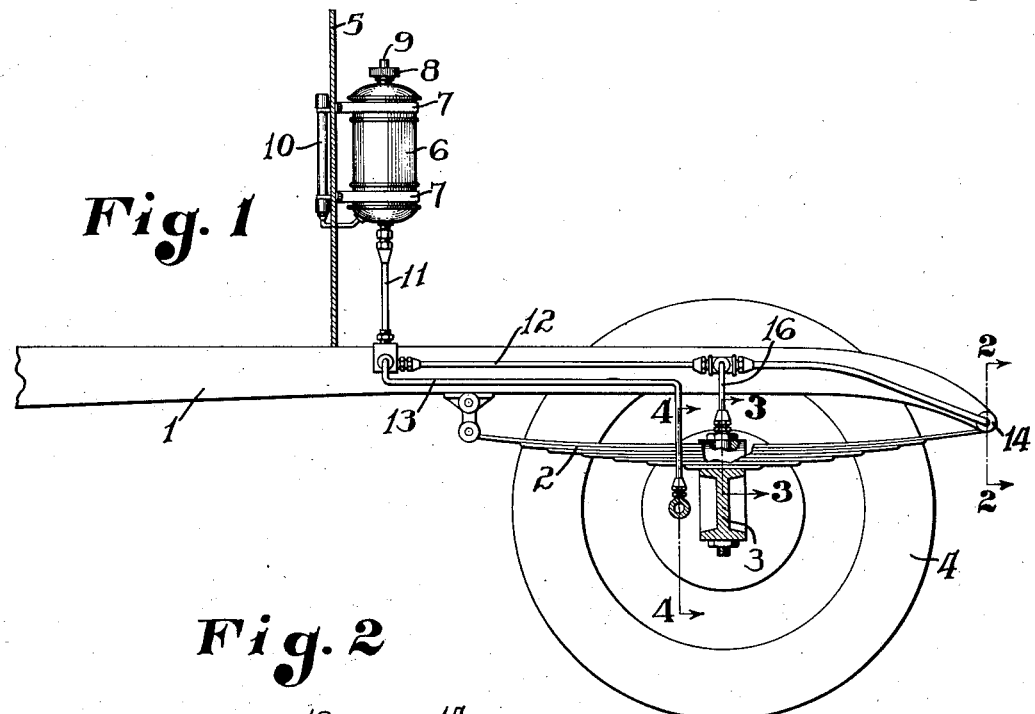

Oct. 18, 1927.

E. R. PILLARS 1,645,661

AUTOMATIC LUBRICATION SYSTEM

Filed Nov. 8, 1926

2 Sheets-Sheet 1

Inventor
Edward R. Pillars
By
Owen & Owen
Attorneys

Oct. 18, 1927.
E. R. PILLARS
1,645,661
AUTOMATIC LUBRICATION SYSTEM
Filed Nov. 8, 1926     2 Sheets-Sheet 2
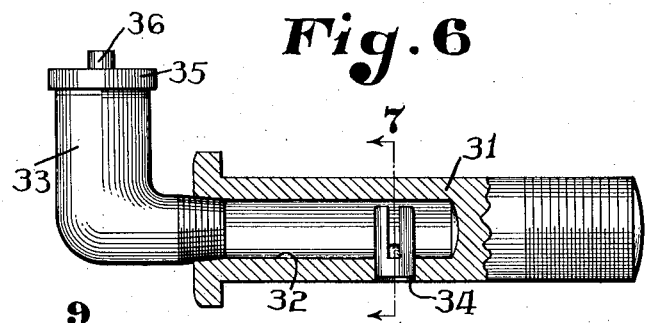
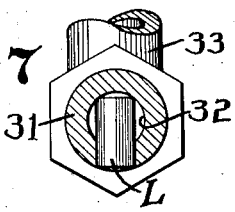
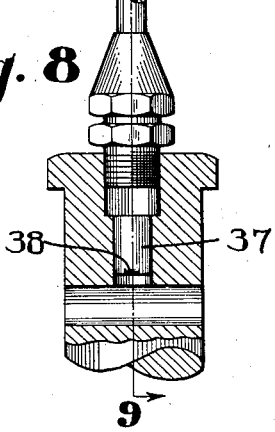
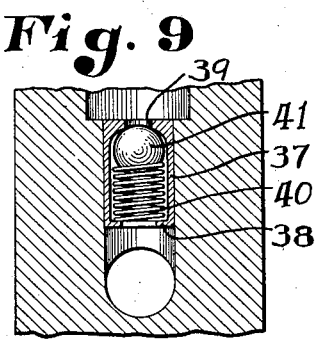
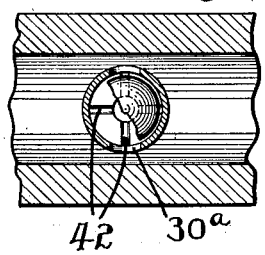
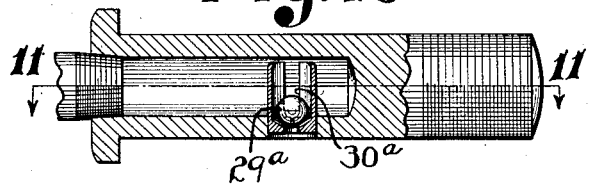
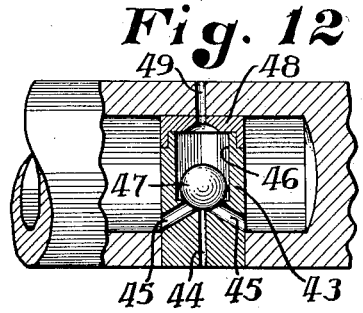
Inventor
Edward R. Pillars
By Owen & Owen
Attorneys Patented Oct. 18, 1927.

1,645,661

UNITED STATES PATENT OFFICE.

EDWARD R. PILLARS, OF FOSTORIA, OHIO.

AUTOMATIC LUBRICATION SYSTEM.

Application filed November 8, 1926. Serial No. 146,959.

This invention relates to lubrication means for machines of all kinds which are subjected to vibratory action, but particularly to automatic vehicles.

It is a desideratum to maintain bearing surfaces continuously coated with a thin film of lubricant so that the friction between the relatively moving parts is reduced to a minimum, and as a consequence the life of the parts is prolonged. It will at once be appreciated that the life of bearings will be enormously increased if lubrication can even approximate the theoretical perfection.

It has been appreciated for a long time that where parts are subjected continuously to pressure on one surface in substantially line contact, it is extremely difficult to maintain adequate lubrication, especially when these parts in horizontal position are given oscillatory motion. In this latter case the pressure being continuously at one point quickly removes the lubricant causing a metal to metal contact.

Lubrication of these parts has heretofore been attempted by means of grease forced under pressure to the desired locality. This has been found decidedly impractical and inefficient, because though tremendous pressure is utilized to force the grease around the bearing surface, after oscillation has taken place the grease is soon forced from the surface where it is needed most, i. e. where the maximum pressure is exerted on the bearing surface. There is no tendency of grease to spread itself over a bearing surface as it is well known that grease is not capillaceous. Therefore, even though careful attention is given to bearings of this nature grease lubrication will not suffice to maintain for any extended period an even coating of lubricant over the bearing surface.

An object of this invention is to overcome the above difficulties and to provide an efficient lubrication system for machines or automotive vehicles which will effectively lubricate bearings and which requires a minimum amount of attention to maintain efficient operation over an extended period of time and which supplies each bearing with sufficient lubrication for the purpose, but prevents delivering to the bearing surface more than is actually required.

Another object of this invention is to provide an automatic oiling device for each bearing which is responsive to the vibratory movement of the machine, and is operable to feed oil to the bearing in sufficient quantities to secure proper lubrication and which automatically stops after the bearing surface is supplied with sufficient lubrication.

Further objects and advantages of this invention will appear as the description proceeds.

In one aspect, this invention provides a lubrication system for automobiles, although its application is not restricted to this use, because it is unquestionably of outstanding value to any machine, either automotive or stationary which has vibration during operation. This system includes a reservoir which may be mounted in any suitable or convenient place, such as on the dash where it is disposed above the bearings to be lubricated. A liquid lubricant is placed in the reservoir, and a cardinal feature of the invention is that the lubricant flows to the bearing surfaces by gravity, thereby eliminating manual pumping operations which have heretofore been necessary, and rendering the system absolutely automatic in operation. In this system, all that is necessary to keep the bearings lubricated is to see that there is lubricant in the reservoir. It is possible that occasional cleaning of the system may be found necessary or desirable, and provision has been made so that air pressure may be employed for this purpose. Thorough cleaning of all bearings may be in this manner taken care of.

If liquid lubricant, even of medium viscosity, were passed from the reservoir to the bearings, without any means for checking the flow, the reservoir would soon become exhausted of its supply. To militate against this, means are provided in the vicinity of and in close relation to the bearings which supply lubricant to the bearing only as it is needed. If the lubricant over the bearing surface is sufficient to secure proper lubrication, the feed is automatically shut off until more is required. The advantage of this system is obvious from the above description, and it will be observed that an exceedingly simple and efficient system is provided which requires a minimum amount of time and trouble to keep in operation.

Another characteristic of the invention consists in the production of an automatic lubricating device which automatically pumps liquid lubricant to the bearings in accordance with the needs of service. After a thin film of lubricant has been formed on the bearing surface, this being sufficient for reducing friction, pumping automatically stops regardless of repeated vibratory action of the machine. This lubricating device is uniquely simple consisting merely of a barrel, and a pump element in the barrel so that a practical and efficient lubricator is provided which has been found empirically to satisfy the demands of service. Mention must also be made of consequent cheapness of construction without the sacrificing of the characteristics of durability and reliability.

Figure 2:
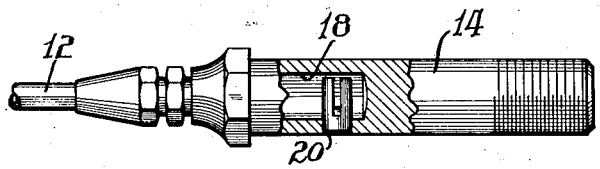
Figure 4:
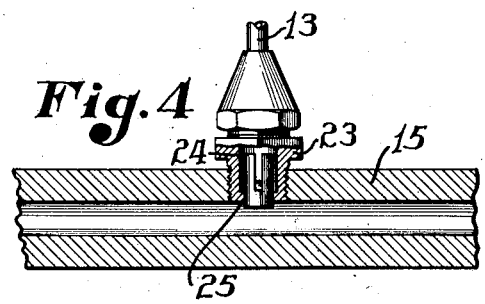
Figure 3:
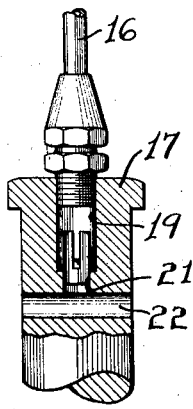
Figure 5:
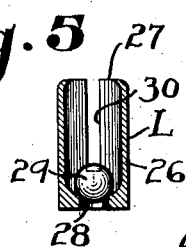

For purpose of illustration and not of limitation, the invention is shown in the accompanying drawings, in which:

Fig. 1 is a side elevation of a chassis frame showing one embodiment of my lubrication system; Fig. 2 is a sectional view on the line 2—2 of Fig. 1; Fig. 3 is a section on the line 3—3 of Fig. 1; Fig. 4 is a section on the line 4—4 of Fig. 1; Fig. 5 is an enlarged vertical sectional view of the cage or pump chamber with the ball pump; Fig. 6 is a side elevation partly in section of another form of the invention showing a bolt provided with my oiling device; Fig. 7 is a transverse sectional view on the line 7—7 of Fig. 6; Fig. 8 is a view similar to Fig. 3, but showing another form of oiling device; Fig. 9 is a section on the line 9—9 of Fig. 8; Fig. 10 is a view similar to Fig. 2, but showing a still further form of oiling device; Fig. 11 is a horizontal section on the line 11—11 of Fig. 10; and Fig. 12 is a fragmentary sectional view of a bolt embodying a further form of my oiling device.

The illustrated embodiment of the invention comprises the side bars 1 of a chassis frame supported by a semi-elliptic leaf spring 2, axle 3 and wheels 4. The dash 5 of the vehicle is diagrammatically represented, and mounted on the forward side of the dash 5 is a reservoir 6 which may be held thereto by clamps 7. The reservoir 6 may be of any suitable conformation and is provided with a filling cap 8 which is equipped with a spring controlled valve 9, somewhat similar to a bicycle valve, and for a purpose hereinafter described. The reservoir 6 may be provided with a sight glass 10 of usual construction to indicate the amount of liquid contained therein, and this glass may be positioned on the rear side of the dash 5.

Extending downwardly from the reservoir 6 is a connection 11, and from the connection 11 extends leads 12 and 13, the lead 12 extending to the spring shackle bolt 14, and the lead 13 extending to the brake housing 15. Connected to the lead 12 is a branch 16 which extends to the usual king bolt 17.

As shown, the shackle bolt 14 and king bolt 17 are formed with chambers 18 and 19, respectively, each chamber being in communication with the pipe leading thereto. The sectional bolt 14 is formed with a relatively short passage 20 leading at right angles from the chamber 18, and the king bolt 17 is formed with a relatively short passage 21 extending in a direction longitudinally of the bolt, this latter passage communicating with a transverse passage 22, which extends to opposite sides of the bolt. Attention is called to the fact that the lead 13 is attached to a connecting member 23 having an integral chamber 24 provided with an axially extending passage 25.

Mounted in the passages 20, 21 and 25 is an automatic lubricating device L, which is adapted to supply liquid lubricant to the respective bearing surfaces in accordance with the demand. When the bearing surface is coated with a thin film of liquid lubricant which is sufficient for the purpose, the device L does not operate. On the other hand, when the bearings require lubricant the vibration of the vehicle is sufficient to operate this device so that a minute quantity of liquid lubricant is supplied to the bearing surface. In this manner there can be no waste of lubricant and only sufficient lubricant for the purpose required will be supplied to the bearing surface.

In this system, oil of the desired consistency is preferably employed as the lubricant. The reservoir 6 is first filled, and the oil flows by gravity to the proximity of the bearings, through the connection 11 and leads 12, 13 and 16. As will be hereinafter described, the automatic oiling device L acts as a check to prevent the out-flow of lubricant when the vehicle is not in motion, or is not creating a vibratory action. Therefore, the lubricating device L not only serves as a check for preventing undue waste of lubricant, but also serves as a pump to feed minute quantities of lubricant to the bearing surfaces when required, and when vibratory action is imparted thereto.

The lubricating device L is of outstanding simplicity, both in operation and in construction. As most clearly shown in Fig. 5, this device comprises an annular metallic barrel or pump chamber 26 having an open upper end 27 which is somewhat constricted, and a relatively small outlet port 28. Disposed within the barrel is a metallic ball 29 which is adapted to seat against the inner end of the port 28, and thereby prevent the passage of liquid therefrom. For admitting liquid lubricant to the inside of the pump barrel, the opposite walls thereof are provided with elongate slots 30, and the lower ends of the opposed slots 30 are disposed slightly above the horizontal axis of the ball 29, when the latter is at rest.

As the several embodiments shown in Figs. 1 to 6, will be readily understood if a description of one form is given, it is deemed sufficient to describe the operation of the form shown in Fig. 2. In this form it is noted that the automatic lubricator L has a press fit within the passage 20, and is disposed at right angles to the longitudinal axis of the bolt. The lower ends of the opposed slots 30 are located slightly above the bottom of the chamber 18. This is to allow sediment or impurities which are either in the oil originally, or which may possibly enter from the outside to settle below the lower ends of the slots 30 so as in no way to interfere with the efficient operation of the device.

As the vehicle travels and encounters irregularities in the road, shock vibration will be imparted to the device L, and cause the ball to jiggle or move up and down in the barrel 26, and as the result of these movements, a small quantity of oil will be forced from the interior of the barrel to the bearing surface. Due to the capillarity of the oil, the bearing surface will soon be completely covered with a thin coating, and after this coating has been obtained, the weight of the ball 28 will not be sufficient to pump or feed additional oil to the bearing surface, and as a consequence, the oil will be returned through the slots 30 to the bolt chamber. It will thus be seen that the function of the slots is also to allow excess oil to return to the bolt chamber instead of being pumped out through the port 20, because the avenue of escape provided by the slots affords a practically unrestricted return passage.

It may be desirable periodically to flush or clean out the bearing surface of sediment, road dust or other impurities which may collect on the bearing surfaces. This may be readily taken care of so that the several bearings are concomitantly cleansed in a minimum amount of time. To do this, kerosene oil is poured into the main reservoir 6. Thereafter, an air hose is attached to the valve 9, and the pressure on the liquid in the reservoir forces this liquid through the several lines to the automatic lubricating devices L.

The fit of the ball upon its seat is imperfect, as described more fully in connection with Figs. 10 and 11. This enables the sediment in the bolt chamber, or chamber of the connector member, to be forced to the bearing surface where it will be washed away by the kerosene oil. After the kerosene oil has been exhausted from the system, the air will act further to clean the pipe lines, chambers and bearing surfaces free of foreign material.

It will be readily observed that this provides a simple and effective manner of cleaning the entire system without requiring disassembling of the parts or special tools. The air hose utilized may be the hose ordinarily employed for pumping tires, and which is accessible to all automobile owners. In this type of lubrication system, it is not always necessary to utilize air pressure for cleansing and flushing purposes, because by putting kerosene oil in the central reservoir or feed chamber, cleansing may be satisfactorily effected because the kerosene oil will be metered out to the bearing surfaces in a gradual manner so that automatically the bearings will be cleaned thoroughly and efficiently. Under extreme conditions the bearings may be flushed by oil under pressure which will tend to wash away sediment and dirt.

The alternate form of the invention shown in Figs. 6 and 7 comprises a bolt 31 having an internal chamber 32, to which is connected an oil cup 33. Leading at right angles from the axial bolt chamber 32 is a relatively short passage 34 in which is arranged an automatic lubricating device L, as above described. The cap 35 for the oil cup 33 may be provided with an air valve 36 similar to the valve 9, heretofore described. The operation of this device will be readily understood, because it embodies the principle heretofore described. This provides a bolt which may be used as a shackle bolt or for other purposes, and in reality provides a unitary lubrication system in which oil may be advantageously used for lubricating the bearing surface.

In Figs. 8 and 9, another form of lubricating device is shown. In this form the pump barrel 37 has an inturned lower flange 38, and a port 39 at the upper end. Disposed within the barrel 37 is a relatively weak coil spring 40 which bears against a ball 41 at its upper end, thereby normally holding the ball seated to close port 39. This device is responsive to the vibratory movements of the vehicle, and permits but a small quantity of lubricant to pass to the bearing surface each time the ball is unseated.

Figs. 10 and 11 show another form of my automatic lubricating device. This form is somewhat similar to that shown in Fig. 5, except the opposed slots 30ª are considerably wider so as to permit the liquid to return to the bolt chamber more readily, and the ball 29ª is considerably smaller than the internal diameter of the pump chamber so that it may move more freely therein. The ball seat is provided with scorings 42 which militate against the ball being forced tightly to its seat when fluid under pressure is supplied to the pump chamber. It will be seen that in this form the fluid, both liquid or air under pressure may pass under the ball 29ª through the scorings 42, and enable the bearing surface and associated portions to be thoroughly cleansed.

It is obvious that the seating of the ball may be made imperfect in other ways, the objects being to allow small passages through which even fluent oil would not pass except under pressure.

A cardinal advantage of the form shown in Figures 10 and 11, whether employed in connection with the cup 33 or control reservoir 6, is that as the liquid lubricant is metered out to the bearing surface, a partial vacuum is created in the cup or reservoir (as the case may be) which acts as a deterrent to the feeding of oil through the scorings 42 until vibration occurs. It will be understood that valve 36 or 9 are strong enough so as not to open until the desired degree of vacuum has been obtained.

The form shown in Fig. 12 comprises a pump barrel 43 having a relatively small outlet passage 44, through which the lubricant may pass to the bearing surface. Relatively large passages 45 are inclined upward from opposite sides of the pump barrel to the pump chamber 46. The ball 47 is adapted to close the passages 44 and 45. By inclining the passages 45 in this manner the lubricant may be readily returned to the bolt chamber or other associated chamber, and this also permits the ball 47 to be readily unseated upon the introduction of fluid under pressure. The upper end of the barrel 43 is closed by a cap 48, and extending through the cap and bolt is a passage 49. The purpose of the passage 49 is to hold the ball 47 at the opposite end of the pump chamber when fluid under pressure is introduced thereto, thus preventing an equalization of pressure within the chamber and doing away with any liability of the ball 47 returning to its seat.

While the various forms of my invention have been described in connection with an automobile, it is to be understood that the above is given by way of illustration and not of limitation, because the invention is equally useful in connection with any machine having a vibratory action. Obviously, the field of use is broad, and it is desired that the invention only be limited in accordance with the appended claims, which are to be interpreted in their broadest sense and meaning. Numerous changes in details of construction, arrangement and choice of materials may be effected without departing from the spirit of the invention. Attention is particularly directed to the fact that although the invention has been described as employing a ball as the pump and check, other types may be used, as for example, a plunger or other devices adapted to vibratory operation, in combination with the central feed reservoir, etc.

What I claim as new and desire to secure by Letters Patent is:

1. In a lubrication system for elements having bearings and which are subjected to vibration when in use, a reservoir for a fluent lubricant, connections providing a duct from the reservoir to the element, and a normally closed feeding means within the element, the feeding means comprising a device operable by vibration to feed lubricant to the bearing surface.

2. In a lubrication system for elements having bearings and which are subjected to vibration when in use, a reservoir for a fluent lubricant, connections providing a duct from the reservoir to the element, and a normally closed feeding means within the element, the feeding means comprising a pump for feeding lubricant to the bearing surface and operable by vibration of the apparatus and having a weight great enough to pump lubricant to the uncovered bearing and small enough to have its pumping action overcome by the resistance of the oil in a fully lubricated bearing.

3. In a lubrication system for elements having bearings and which are subjected to vibration when in use, a reservoir for a fluent lubricant, a normally closed feeding means within the element, and a duct from the reservoir to the feeding means, the feeding means comprising a pump cylinder and a pumping element loosely disposed therein for feeding lubricant to the bearing surface in response to vibration of the apparatus, said pumping element also operating as a check against hydraulic pressure of the oil in the duct to prevent feeding of excess lubricant to the covered bearing.

4. In a lubrication system, a bearing subjected to vibration when in use, a reservoir for a fluent lubricant, connections providing a duct from the reservoir to the bearing surface, a normally closed feeding means in the duct in proximity to the bearing surface, the feeding means comprising a device operable by vibration to feed lubricant to the bearing surface, means for introducing air under pressure to said reservoir for blowing out the bearing surface, said device comprising an imperfectly seated check valve, the imperfection being too slight to permit the passage of oil under normal pressure, but being sufficient to permit the passage of air or of oil under heavier pressure than normal.

5. In combination, a bearing, a reservoir for a fluent lubricant, connections providing a duct from the reservoir to the bearing surface, and an imperfectly seated check valve for said duct, the imperfection being too slight to permit the passage of oil under normal pressure, but being sufficient to permit the passage of air or of oil under heavier pressure than normal.

6. In a lubrication system, a single reservoir, a plurality of elements having bearings at varying distances from said reservoir, connections providing ducts from said reservoir to the bearings, and a feeding means in each element controlling the flow of lubricant in accordance with the individual need of the respective bearings, the feeding means comprising a device operable by vibration to feed lubricant to the bearing surface.

In testimony whereof I have hereunto signed my name to this specification.

EDWARD R. PILLARS.